United States Patent
Masuyama et al.

(10) Patent No.: US 9,853,911 B2
(45) Date of Patent: Dec. 26, 2017

(54) SYSTEM AND METHOD FOR MANAGEMENT NETWORK ACTIVITY IN A DATA CENTER ENVIRONMENT

(71) Applicant: Dell Products, LP, Round Rock, TX (US)

(72) Inventors: Jinsaku Masuyama, Cedar Park, TX (US); Sajjad Ahmed, Round Rock, TX (US); John R. Palmer, Georgetown, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 267 days.

(21) Appl. No.: 14/626,530

(22) Filed: Feb. 19, 2015

(65) Prior Publication Data

US 2016/0248697 A1  Aug. 25, 2016

(51) Int. Cl.
H04L 12/28 (2006.01)
H04L 12/911 (2013.01)
H04L 12/24 (2006.01)

(52) U.S. Cl.
CPC ........ *H04L 47/783* (2013.01); *H04L 41/0668* (2013.01); *H04L 41/0695* (2013.01)

(58) Field of Classification Search
None
See application file for complete search history.

(56) References Cited

U.S. PATENT DOCUMENTS

| | | |
|---|---|---|
| 5,335,985 A | 8/1994 | Baur |
| 5,434,775 A | 7/1995 | Sims et al. |
| 5,505,533 A | 4/1996 | Kammersgard et al. |
| 5,774,668 A | 6/1998 | Choquier et al. |
| 5,805,442 A | 9/1998 | Crater et al. |
| 5,869,820 A | 2/1999 | Chen et al. |
| 5,910,776 A | 6/1999 | Black |
| 5,913,034 A | 6/1999 | Malcolm |
| 5,926,463 A | 7/1999 | Ahearn et al. |
| 5,956,665 A | 9/1999 | Martinez et al. |
| 5,956,723 A | 9/1999 | Zhu |
| 5,959,012 A | 9/1999 | Simonian et al. |
| 6,057,981 A | 5/2000 | Fish et al. |
| 6,112,246 A | 8/2000 | Horbal et al. |
| 6,131,119 A | 10/2000 | Fukui |
| 6,167,448 A | 12/2000 | Hemphill et al. |
| 6,282,175 B1 | 8/2001 | Steele et al. |
| 6,601,084 B1 | 7/2003 | Bhaskaran et al. |

(Continued)

*Primary Examiner* — Fan Ng
(74) *Attorney, Agent, or Firm* — Larson Newman, LLP (57) ABSTRACT

An information handling system includes a management switch and a plurality of management controllers coupled to the management switch to form a management network. A first management controller of the plurality of management controllers receives from the management switch a first list of active ports, wherein each particular active port includes an associated second management controller of the plurality of management controllers that is coupled to the particular active port. The first management controller further receives from the management switch, a plurality of second lists, one for each particular active port in the first list, each second list including an identification for the associated second management controller, and determines a map of the management network based upon the first list and the plurality of second lists.

18 Claims, 4 Drawing Sheets

(56) References Cited

U.S. PATENT DOCUMENTS

| | | |
|---|---|---|
| 6,654,347 B1 | 11/2003 | Wiedeman et al. |
| 6,714,977 B1 | 3/2004 | Fowler et al. |
| 6,826,714 B2 | 11/2004 | Coffey et al. |
| 7,696,506 B2 | 4/2010 | Lung |
| 7,720,987 B2 | 5/2010 | Penk et al. |
| 8,037,330 B2 | 10/2011 | Livescu et al. |
| 8,732,508 B2 | 5/2014 | Cochran et al. |
| 2002/0095487 A1 | 7/2002 | Day et al. |
| 2002/0141210 A1 | 10/2002 | Glannopoulos et al. |
| 2003/0046339 A1 | 3/2003 | Ip |
| 2004/0010649 A1 | 1/2004 | Weaver et al. |
| 2007/0094426 A1 | 4/2007 | Chiang et al. |
| 2008/0317021 A1 | 12/2008 | Ives et al. |
| 2009/0189774 A1 | 7/2009 | Brundridge et al. |
| 2009/0217073 A1 | 8/2009 | Brech et al. |
| 2009/0307515 A1 | 12/2009 | Bandholz et al. |
| 2010/0027687 A1 | 2/2010 | De Natale et al. |
| 2010/0106154 A1 | 4/2010 | Harlev et al. |
| 2011/0022245 A1 | 1/2011 | Goodrum et al. |
| 2011/0179301 A1 | 7/2011 | Liu et al. |
| 2011/0202768 A1* | 8/2011 | Choi .................. G06F 21/41 713/168 |
| 2012/0262956 A1 | 10/2012 | DeHaven |
| 2012/0303767 A1 | 11/2012 | Renzin |
| 2013/0007249 A1 | 1/2013 | Wang et al. |
| 2014/0025817 A1* | 1/2014 | Lau .................. H04L 49/30 709/225 |

\* cited by examiner

SYSTEM AND METHOD FOR MANAGEMENT NETWORK ACTIVITY IN A DATA CENTER ENVIRONMENT

FIELD OF THE DISCLOSURE

This disclosure relates generally to information handling systems, and more particularly relates to a system and method for management network activity in a data center environment.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

A data center is a facility to house a group of networked information handling systems typically used by organizations for the remote storage, processing, or distribution of large amounts of data. A data center normally includes associated components, such as telecommunication systems, storage systems, power supplies, environmental controls, and security infrastructure. A data center may include a group of server racks that house the information handling systems, and that are located on floor tiles of a raised floor. A space below the raised floor can be utilized to provide an air flow from an air conditioning system to the server racks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
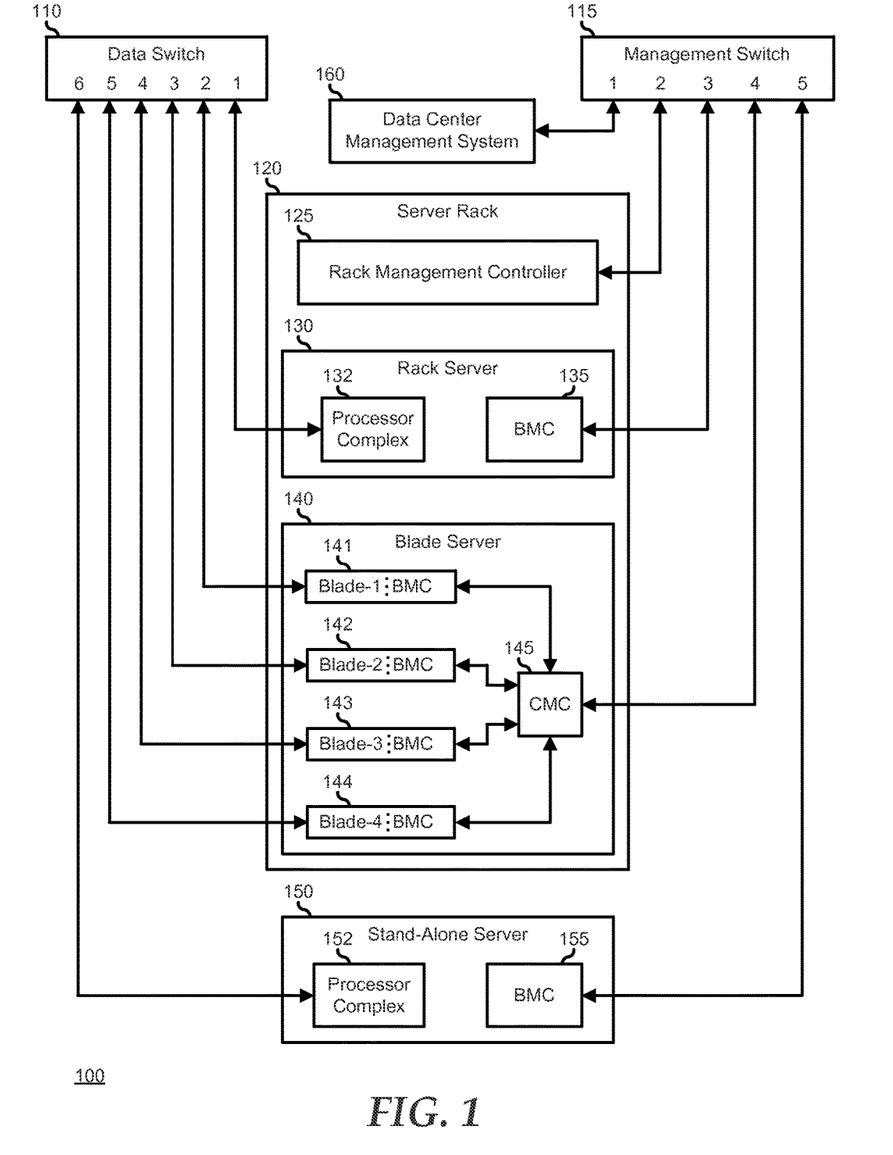
FIG. 1 is a block diagram of a data center according to an embodiment of the present disclosure.

FIG. 1 illustrates a data center 100 including a data switch 110, a management switch 115, a server rack 120, a stand-alone server 160, and a data center management system 160. Server rack 120 includes a rack management controller (RMC) 125, a rack-mounted rack server 130, and a rack-mounted blade server 140. Rack server 130 includes a processor complex 132 and a baseboard management controller (BMC) 135.

Blade server 140 includes server blades 141, 142, 143, and 144, and a chassis management controller (CMC) 145. Each of server blades 141, 142, 143, and 144 include an embedded BMC. Stand-alone server 150 includes a processor complex 152 and a BMC 155.

Data switch 110 represents a network switching and routing device that is coupled to the data processing elements of data center 100 to permit data routing between the data processing elements to provide the core data processing functions of the data center. As such, data switch 110 includes a number of data ports that permit the connection of the data processing elements to the data switch. As such, processor complex 132 is connected to a first port (port 1) of data switch 110, server blade 141 is connected to a second port (port 2) of the data switch, server blade 142 is connected to a third port (port 3) of the data switch, server blade 143 is connected to a fourth port (port 4) of the data switch, server blade 144 is connected to a fifth port (port 5) of the data switch, and processor complex 152 is connected to a sixth port (port 6) of the data switch. The skilled artisan will understand that data switch 110 can include one or more additional data ports and that the data network of data center 100 can include additional processing elements, storage elements, user access elements, other elements, or a combination thereof, as needed or desired. Moreover, data center 100 can include one or more additional data switches similar to data switch 110 and that form a part of the data network associated with data switch 110, or that form a separate data network. The operation and function of the data network of data center 100 are understood to the skilled artisan and will not be discussed further herein.

Management switch 115 represents a network switching and routing device that is coupled to the management elements of data center 100 to permit data routing between the management elements to control resource management aspects of the data center. As such, data center management system 160 is connected to a first port (port 1) of management switch 115, RMC 125 is connected to a second port (port 2) of the management switch, BMC 135 is connected to a third port (port 3) of the management switch, CMC 145 is connected to a fourth port (port 4) of the management switch, and BMC 155 is connected to a fifth port (port 5) of the management switch. In the illustrated embodiment, the BMCs associated with server blades 141, 142, 143, and 144 are connected to the management network via CMC 145. In another embodiment, the BMCs with server blades 141, 142, 143, and 144 are connected to the management network via connections to separate ports of management switch 115. The skilled artisan will understand that management switch 115 can include one or more additional data ports and that the management network of data center 100 can include additional management controllers, as needed or desired. Moreover, data center 100 can include one or more additional management switches similar to management switch 115 and that form a part of the management network associated with management switch 115, or that form a separate management network. Further, the skilled artisan will understand that data switch 110 and management switch 115 can represent a single network switching and routing device that operates to isolate the switching and routing functions for the data network from the switching and routing functions for the management network. As used herein, the term management elements refers to one or more of data center management system 160, RMC 125, BMCs 125 and 155, CMC 145, and the BMCs associated with blade servers 141, 142, 143, and 144, and can include one or more additional similar management elements of data center 100.

The management elements of the management network provide out-of-band monitoring, management, and control of the elements of data center 100. In particular, data center management system 160 operates as a centralized system for communicating with the management elements of data center 100 to perform the monitoring, management, and control of the associated elements. As such, data center management system 160 can receive various alerts and event logs that relate to the operating parameters within the elements of data center 100. RMC 125 operates to monitor, manage, and control various operating parameters of server rack 120, as distinct from the operating parameters of the elements installed into the server rack. For example, RMC 125 can monitor and control the environmental conditions within server rack 120, the power performance for the elements installed into the server rack, and other management functions for the server rack, as needed or desired. Similarly, BMC 135 operates to monitor, manage, and control various operating parameters of rack server 130, CMC 145 operates to monitor, manage, and control various operating parameters of blade server 140, and BMC 155 operates to monitor, manage, and control various operating parameters of standalone server 150. Likewise, the BMCs in server blades 141, 142, 143, and 144 operate to monitor, manage, and control various operating parameters of their respective server blades.

Data center 100 operates actively discover and manage the configuration of the management network, to provide mirrored copies of information for the management elements of the management network, to provide managed failover functionality within the management network, and to mitigate against race conditions in the operation of the management elements of the data center. In particular, data center 100 operates such that each management element in the management network is provided with a management network map. In a particular embodiment, data center management system 160 detects when a new management element is connected to the management network or when an existing management element is disconnected from the management network, compiles an updated management network map, and distributes the management network map to the management elements. Here, management switch 115 can be configured to provide information related to the network connectivity of the new management element to data center management system 160 whenever the management switch detects the new management element or whenever an existing management element is disconnected from the management switch. Alternatively, data center management system 160 can periodically perform a management network map discovery method, as described below, to determine the management network map. In another embodiment, each management element can perform the management network map discovery method to determine the management network map for itself.

Table 1 illustrates an example of a management network map. Here each switch port of management switch 115 is identified, along with the management elements that are connected to each switch port, the Media Access Control (MAC) addresses that are associated with each switch port, and a rank associated with each management element, as shall be described further, below. For example, switch port 4 is connected to CMC 145 with a MAC address of 00:00:00:00:04, and to the BMCs associated with server blades 141, 142, 143, and 144, with respective MAC addresses 00:00:00:01:01, 00:00:00:01:02, 00:00:00:01:03, and 00:00:00:01:04.

TABLE 1

Management Network Map

| Switch Port | Element | MAC Address | Rank |
|---|---|---|---|
| 1 | DCMS | 00:00:00:00:01 | 1 |
| 2 | RMC | 00:00:00:00:02 | 2 |
| 3 | RS-BMC | 00:00:00:00:03 | 4 |
| 4 | CMC | 00:00:00:00:04 | 3 |
|  | Blade-1-BMC | 00:00:00:01:01 | 6 |
|  | Blade-2-BMC | 00:00:00:01:02 | 7 |
|  | Blade-3-BMC | 00:00:00:01:03 | 8 |
|  | Blade-4-BMC | 00:00:00:01:04 | 9 |
| 5 | SaS-BMC | 00:00:00:00:05 | 5 |

Figure 2:
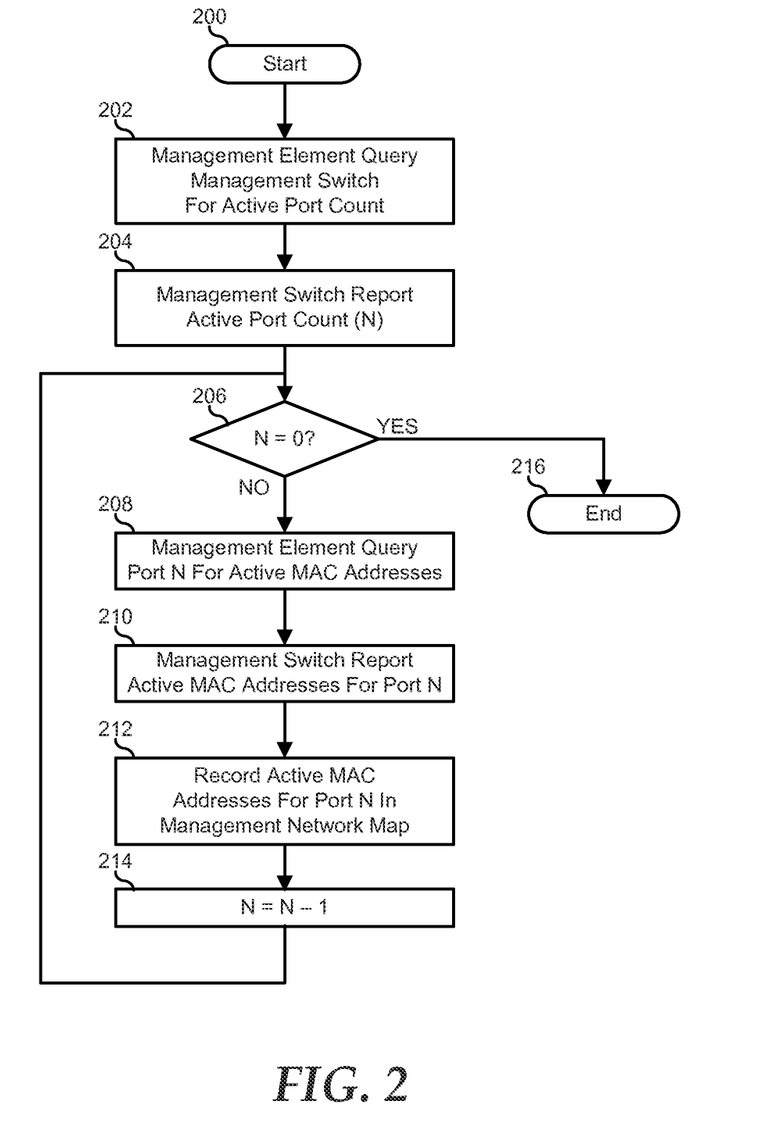
FIG. 2 is a flowchart illustrating a method for management network map discovery in a data center environment according to an embodiment of the present disclosure.

FIG. 2 illustrates a method for management network map discovery in a data center environment, starting at block 200. In block 202, a management element queries a management switch to determine an active port count on a management network. For example, data center management system 160 or another management element of data center 100 can query management switch 115 to determine the number of active ports on the management network. In block 204, the management element receives the active port count (N) from the management switch. For example, management switch 115 can provide information to data center management system 115 that there are five (5) active ports on the management network.

The method enters a loop for each active port, starting with the Nth active port, by determining if the current value of N is equal to zero (0) in decision block 206. If not, the "NO" branch of decision block 206 is taken and the management element queries the management switch to determine the active MAC addresses that are associated with port N in block 208. For example, data center management system 160 can query management switch 115 as to the active MAC addresses associated with port 5. In block 210, the management element receives the active MAC addresses associated with port N from the management switch. For example, management switch 115 can provide information to data center management system 115 that the MAC address associated with port 5 is 00:00:00:00:05, and that the MAC address is associated with BMC 155 in stand-alone server 150. In block 212, the management element records the active MAC addresses associated with the Nth active port in a management network map. For example, data center management system 160 can populate the entry for port 5 in a management network map, such as Table 1. In block 214, the active network port number is decremented, such that a next active network port is discovered, and the method returns to decision block 206, where a decision is made as to whether or not N is equal to zero. When N is equal to zero, that is, when all active ports have been discovered, the "YES" branch of decision block 206 is taken, and the method ends in block 216.

While the method disclosed in FIG. 2 is provided in terms of a consecutive discovery of N active ports on a management switch, the skilled artisan will recognize that the discovery does not necessarily require the consecutive numbering of the active ports on a management switch. For example, a management switch can have active ports that are not consecutively numbered. Here, the management switch can provide a list of the active port numbers in response to the query for the active port count as shown in block 204, and the management element can loop through the active ports based upon the active port numbers, rather than based upon the active port count N. The method disclosed in FIG. 2 can be performed by a single management element, and the resulting map can be provided to the other management elements, or each management element can perform the disclosed method. Further, the method disclosed in FIG. 2 can be performed when the management switch detects a change in the management network configuration, or can be performed on a periodic basis.

Returning to FIG. 1, after the management network map is created, data center 100 operates to provide mirrored copies of critical information for the management elements of the management network. In a particular information, the critical information includes configuration settings for each of the management elements, such as sensor and control addressing, control thresholds such as temperature and power limits, and other configuration settings, as needed or desired. In another embodiment, the critical information includes a back-up of the operating code associated with each management element. For example, the operating code associated with a management element can be quite compact, requiring on the order of tens of megabytes (mB) of storage, while a typical management element can include a flash memory device with a capacity on the order of tens of gigabytes (gB). As such, each management element could easily store the operating code for all of the management elements in a management network, particularly where some management elements may have identical operating code. In still another embodiment, the critical information can include sensor data history for one or more sensors associated with a particular management element. For example, thermal sensor data or power sensor data histories for each management element can be stored on all management elements as a redundant backup. In this way, when a particular management element fails, a backup of the critical information is readily available to restore the failed management element.

In addition, given the inclusion of the rank information associated with each management element, as depicted in Table 1, data center 100 operates to provide a managed failover path for the management elements of the data center. For example, data center management system 160 can be a first prioritized management element. Then, because RMC 125 is typically closely coupled to the operation of the management elements of server rack 120, the RMC can be a second prioritized management element, and so forth. Moreover, where the management elements are provided with a rank order, data center 100 operates to mitigate against race conditions in the operation of the management elements of the data center. For example, where server rack 120 is performing an initial power on operation, the power inrush of powering on rack management controller 125, rack server 130, and blade server 140 simultaneously may be undesirable. As such, data center 100 operates to manage race conditions based upon the rank order of the management elements of the data center.

Figure 3:
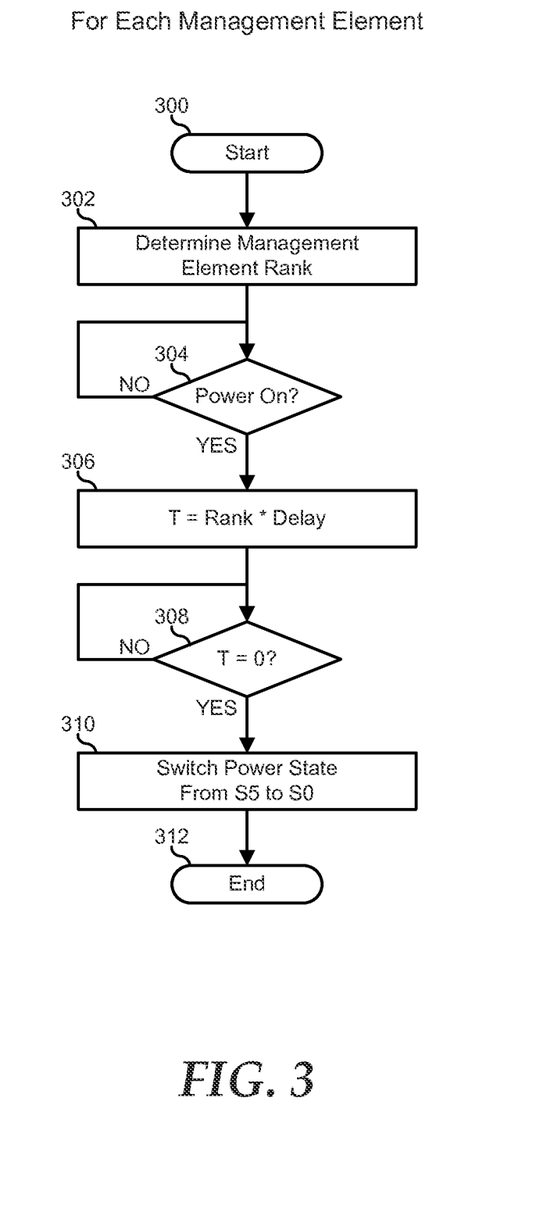
FIG. 3 is a method for managing a power on race condition in a data center environment according to an embodiment of the present disclosure.

FIG. 3 illustrates a method for managing a power on race condition in a data center environment. The method is performed for each management element in a management network, and starts at block 300. In block 302, a management element determines its rank in the management network. The method enters a loop, waiting for a signal to the managed element that the processing element associated with the management element is to be powered on in decision block 304. When no power on signal is received, the "NO" branch of decision block 304 is taken and the method continues in the loop at decision block 304. When the management element receives the signal to power on the processing element associated with the management element, the "YES" branch of decision block 304 is taken, and a timer is set to equal the product of the rank of the management element and a predetermined time delay in block 306.

The method enters a loop, waiting for the timer to be decremented to zero (0) in decision block 308. When the timer is greater than zero (0), the "NO" branch of decision block 308 is taken and the method continues in the loop at decision block 308. When the timer decrements to zero (0), the "YES" branch of decision block 308 is taken, the management element switches the power on for the processing element associated with the managed element in block 310, and the method ends in block 312.

Figure 4:
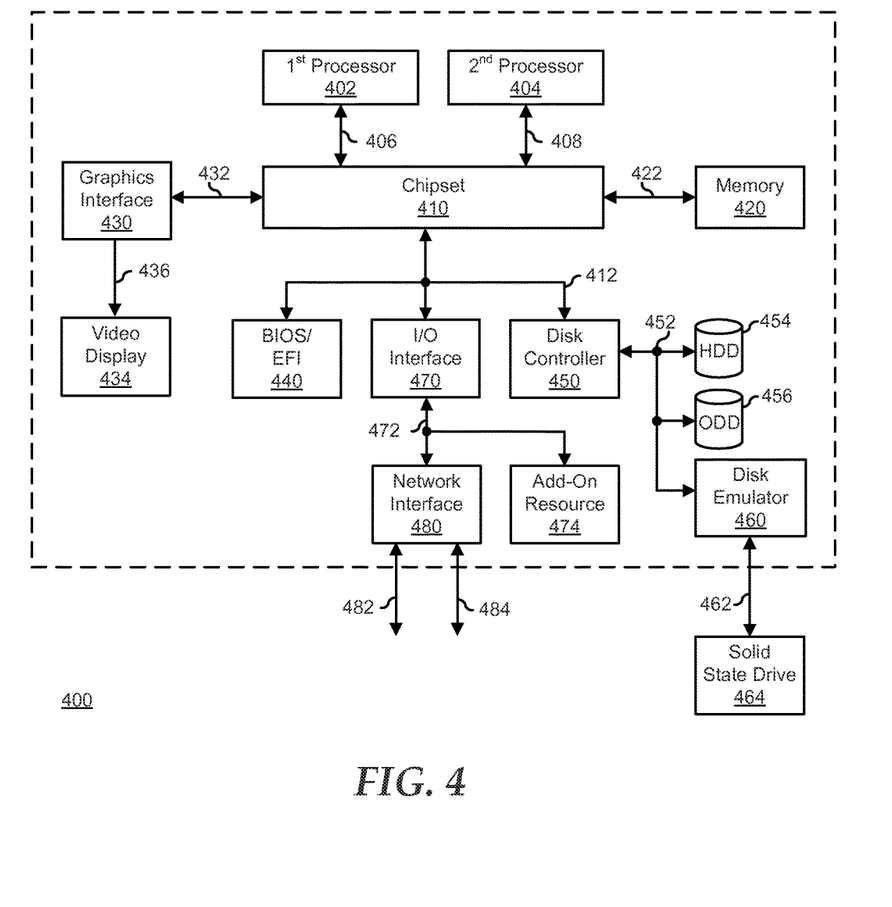
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the 0/O interface to an add-on resource 474 and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

The skilled artisan will recognize that, where a particular device type, standard, or operation is specified, that suitable alternatives as needed or desired can be incorporated along with the teachings herein. For example, where the present disclosure describes network communications such as Ethernet communications, other communication standards, hardware, or software can be utilized to provide communications of sufficient bandwidth to perform the operations, teachings, and methods as disclosed herein.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a management switch device; and
a plurality of management controller device coupled to the management switch devices to form a management network;
wherein a first management controller device of the plurality of management controller devices:

receives from the management switch device a first list of active ports, wherein each particular active port is coupled to an associated second management controller device of the plurality of management controller devices; receives from the management switch device a plurality of second lists, one for each particular active port in the first list, each second list including an identification for the associated second management controller device; determines a map of the management network based upon the first list and the plurality of second lists; and controls operation of the plurality of management controller device based upon the map and wherein a second management controller device of the plurality of management controller devices:

determines that the first management controller devices has failed: and controls operation of the plurality of management controller device based upon the map in response to determining that the first management controller device has failed.

2. The information handling system of claim 1, wherein further the first management controller device:

mirrors first information for the first management controller device to third management controller device of the plurality of management controller devices based upon the map of the management network.

3. The information handling system of claim 2, wherein the first information comprises a configuration setting for a processing system associated with the first management controller device.

4. The information handling system of claim 3, wherein the configuration setting comprises at least one of a sensor address for the processing system, a control address for the processing system, and a control threshold for the processing system.

5. The information handling system of claim 2, wherein the first information comprises a back-up of operating code associated with the first management controller device.

6. The information handling system of claim 2, wherein the first information comprises sensor data history for the processing system.

7. The information handling system of claim 2, wherein further the first management controller device: receives mirrored second information from each of the third management controller devices based upon the map of the management network; and stores the mirrored second information.

8. The information handling system or claim 1, wherein further the first management controller device:

includes a rank among the plurality of management controller device;

receives a signal to power on a processing system associated with the first management controller device; and powers on the processing system after a delay in response to receiving the signal, the delay being based upon the rank.

9. A method comprising:

receiving, at a first management controller of a plurality of management controllers, a first list of active ports from a management switch that is coupled to the first management controller, wherein each particular active port includes is coupled to an associated second management controller of the plurality of management controllers, wherein each management controller is included in one of a plurality of devices that are managed by the management network;

receiving, from the management switch, a plurality of second lists, one for each particular active port in the first list, each second list including an identification for the associated second management controller;

determining, at the first management controller, a map of the management network based upon the first list and the plurality of second lists;

determining, by the first management controller, that a particular one of the second management controllers has failed;

retrieving the mirrored second data associated with the particular second management controller; and restoring the particular second management controller with the associated mirrored second data.

10. The method of claim 9, further comprising:

mirroring, at the first management controller, first information for the first management controller to the second management controllers based upon the map of the management network.

11. The method of claim 10, wherein the first information comprises a configuration setting for a processing system associated with the first management controller.

12. The method of claim 11, wherein the configuration setting comprises at least one of a sensor address for the processing system, a control address for the processing system, and a control threshold for the processing system.

13. The method of claim 10, wherein the first information comprises a back-up of operating code associated with the first management controller.

14. The method of claim 10, wherein the first information comprises sensor data history for the processing system.

15. The method of claim 10, further comprising:

receiving, at the first management controller, mirrored second information from each of the second management controllers based upon the map of the management network; and storing, at the first management controller, the mirrored second information.

16. The method or claim 9, wherein:

the first management controller includes a rank among the plurality of management controllers; and the method further comprises:

receiving a signal to power on a processing system associated with the first management controller; and powering on the processing system after a delay in response to receiving the signal, the delay being based upon the rank.

17. A non-transitory computer-readable medium including code for performing a method, the method comprising:

receiving, at a first management controller of a plurality of management controllers, a first list of active ports from a management switch that is coupled to the first management controller, wherein each particular active port is coupled to an associated second management controller of the plurality of management controllers, wherein each management controller is included in one of a plurality of devices that are managed by the management network;

receiving, from the management switch, a plurality of second lists, one for each particular active port in the first list, each second list including an identification for the associated second management controller;

determining, at the first management controller, a map of the management network based upon the first list and the plurality of second lists;

determining, by the first management controller, that a particular one of the second management controllers has failed;
retrieving the mirrored second data associated with the particular second management controller; and
restoring the particular second management controller with the associated mirrored second data.

18. The computer-readable medium of claim 17, the method further comprising:
mirroring, at the first management controller, first information for the first management controller to the second management controllers based upon the map of the management network.

* * * * *